United States Patent [19]
Reynolds

[11] Patent Number: 5,881,371
[45] Date of Patent: Mar. 9, 1999

[54] ANTENNA SWITCHING TECHNIQUE FOR IMPROVED DATA THROUGHPUT IN COMMUNICATION NETWORKS

[75] Inventor: Jim Reynolds, San Jose, Calif.

[73] Assignee: Trimble Navigation Limited, Sunnyvale, Calif.

[21] Appl. No.: 549,631

[22] Filed: Oct. 27, 1995

[51] Int. Cl.⁶ .............................. H04B 1/40; H04B 1/44
[52] U.S. Cl. .............................................. 455/83; 455/88
[58] Field of Search .............................. 455/66, 67.1, 68, 455/79, 82, 83, 88, 103, 129

[56] References Cited

U.S. PATENT DOCUMENTS

| | | | |
|---|---|---|---|
| 4,885,799 | 12/1989 | Van Horn | 455/83 |
| 4,903,257 | 2/1990 | Takeda et al. | 455/83 |
| 4,980,660 | 12/1990 | Nakamura et al. | 455/83 |
| 5,471,196 | 11/1995 | Pilested | 455/83 |
| 5,483,676 | 1/1996 | Mahany et al. | 455/88 |
| 5,493,694 | 2/1996 | Vicek et al. | 455/54.2 |
| 5,546,057 | 8/1996 | Pfitzenmaier | 455/103 |

FOREIGN PATENT DOCUMENTS 2735342  2/1979  Germany ................................. 455/78

*Primary Examiner*—Reinhard J. Eisenzopf
*Assistant Examiner*—Sam Bhattacharya
*Attorney, Agent, or Firm*—Boris G. Tankhilevich

[57] ABSTRACT

The r.f. power generating apparatus interacting with the communication network is disclosed. The apparatus comprises the dummy load and the computer operated antenna-dummy load switch. The computer operates the antenna-dummy load switch in such a way that the attack and decay phases associated with the data transmission from the r.f. power generating apparatus to the communication network are eliminated. A plurality of the r.f. apparatuses interacting with the same communication network on the same frequency wherein each of the apparatuses includes the antenna-dummy load switch is also disclosed.

13 Claims, 6 Drawing Sheets

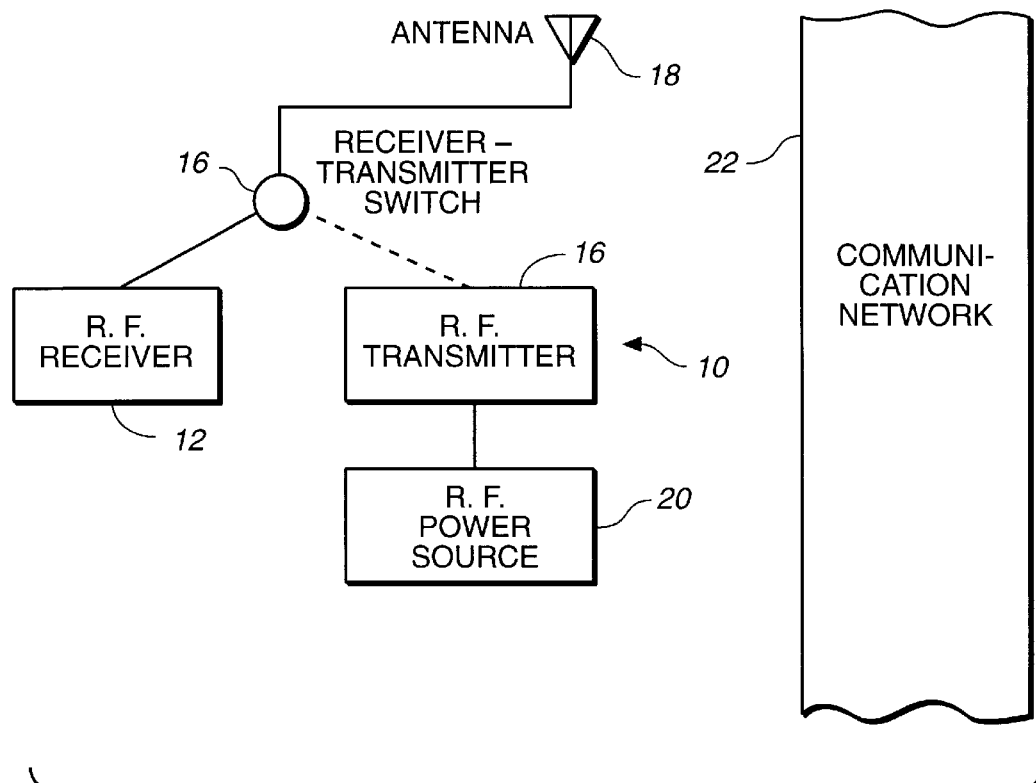
FIG._1
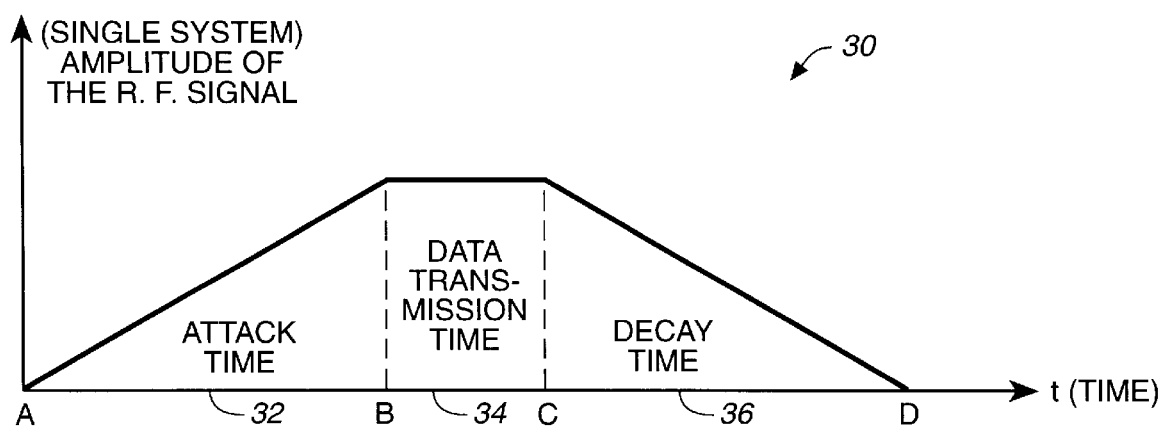
FIG._2

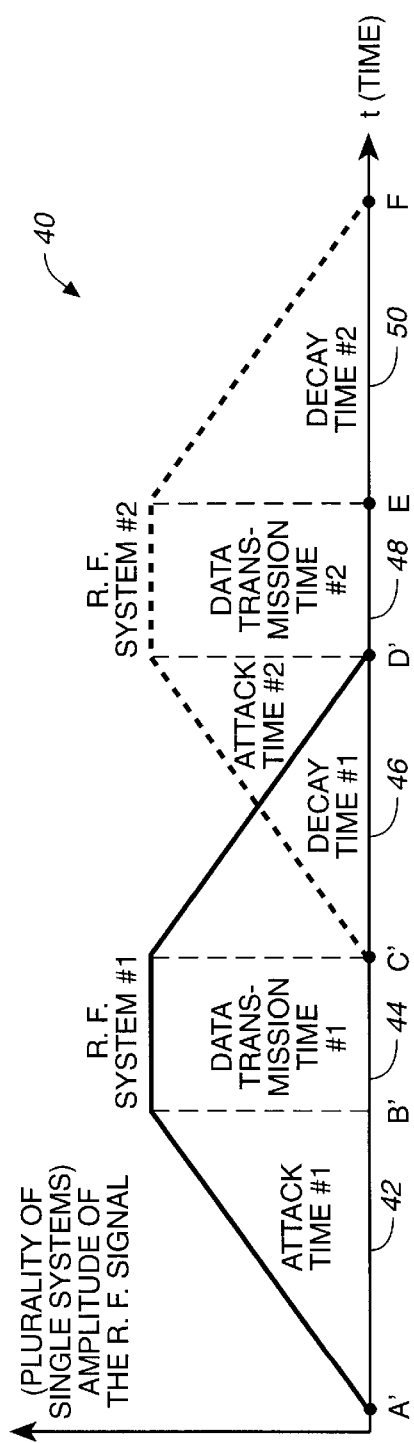
FIG._3
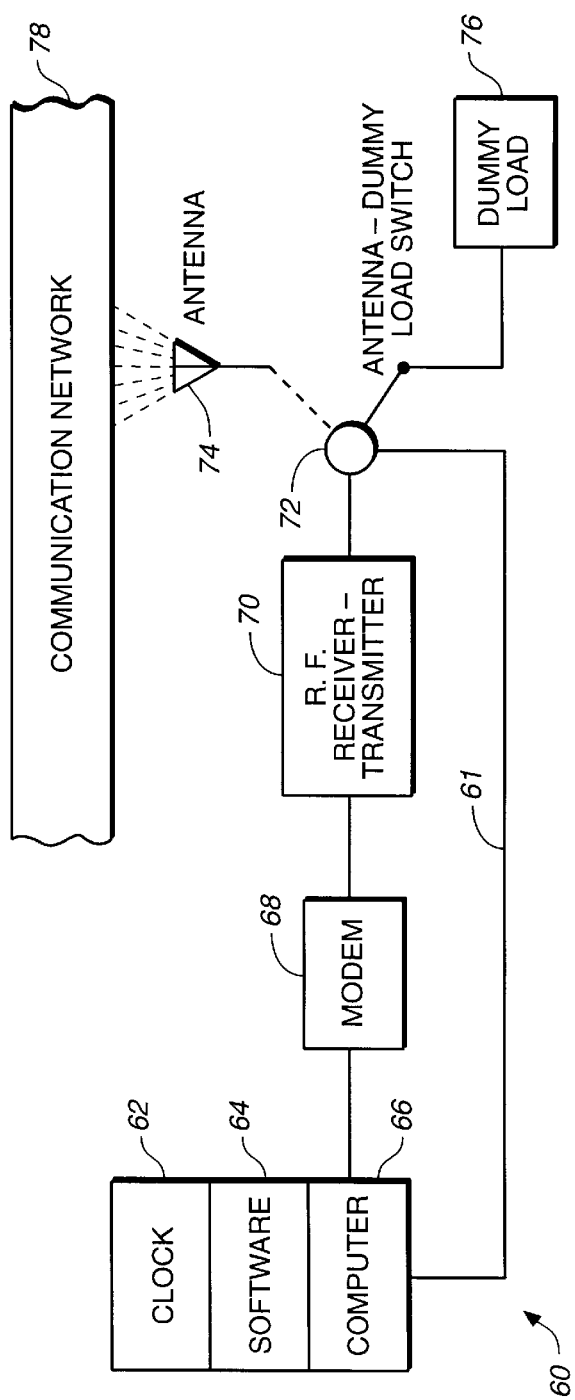
FIG._4A

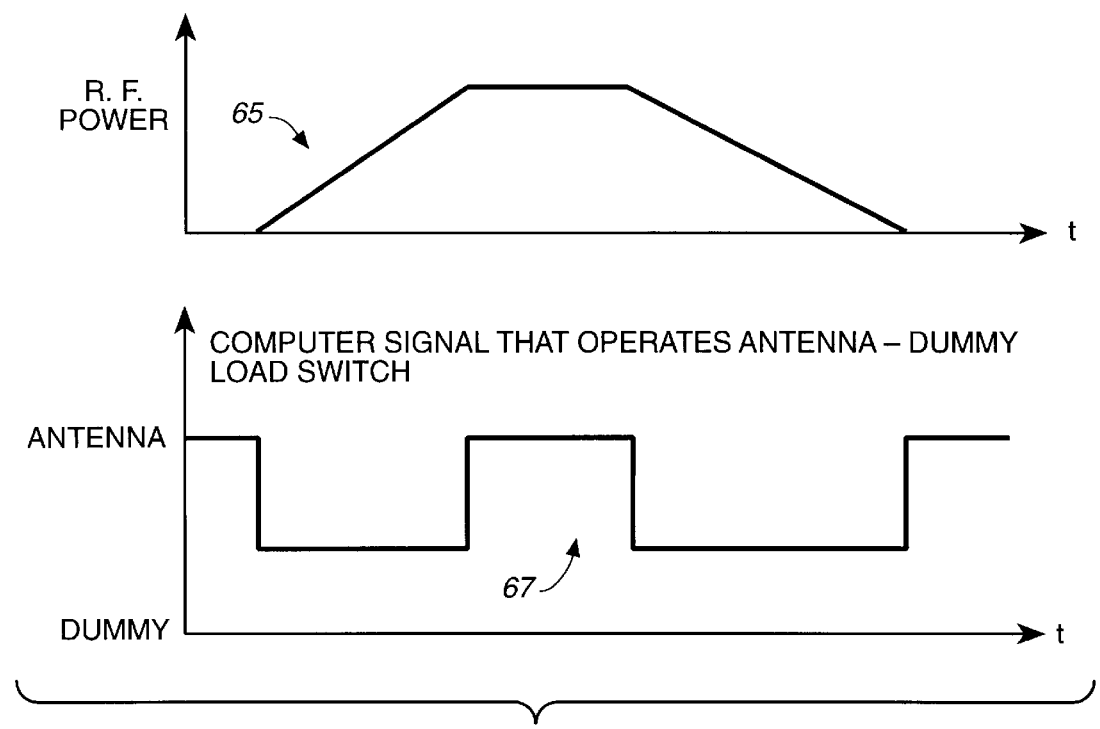
FIG._4B
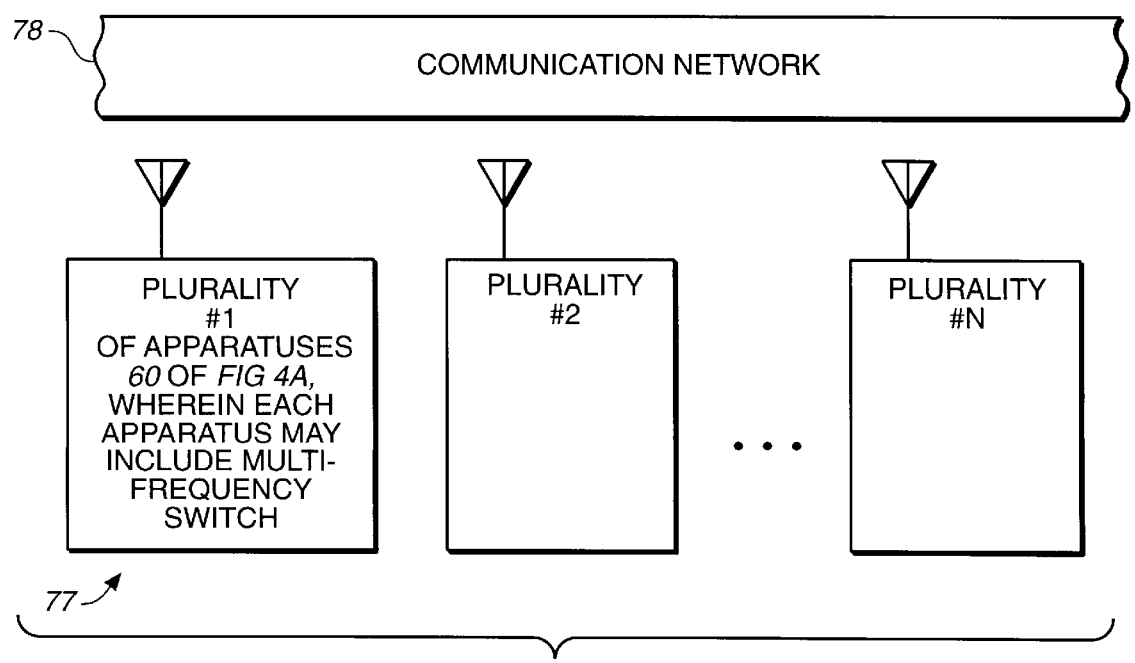
FIG._4C

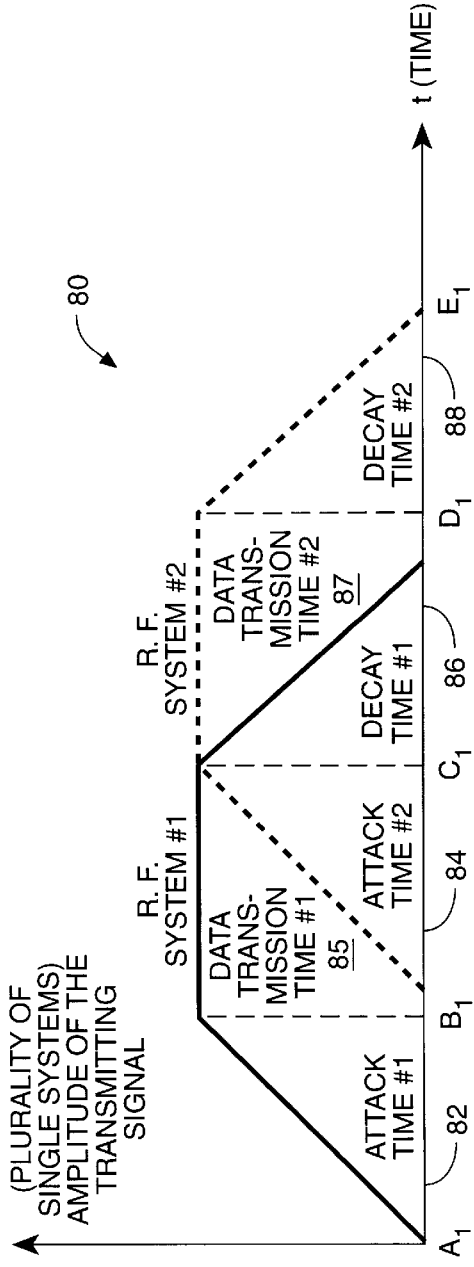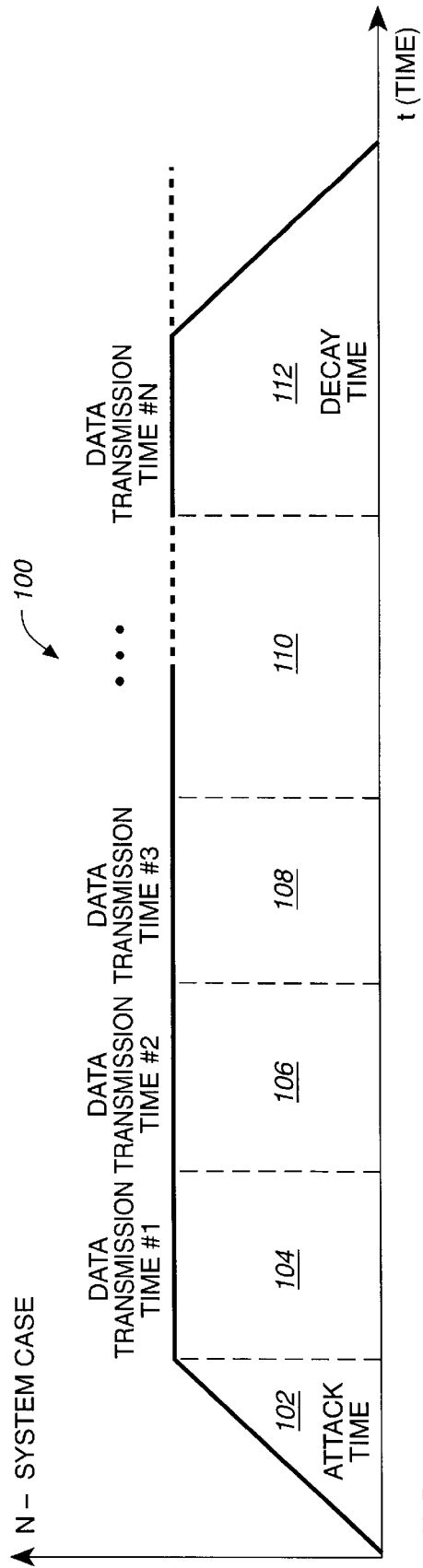

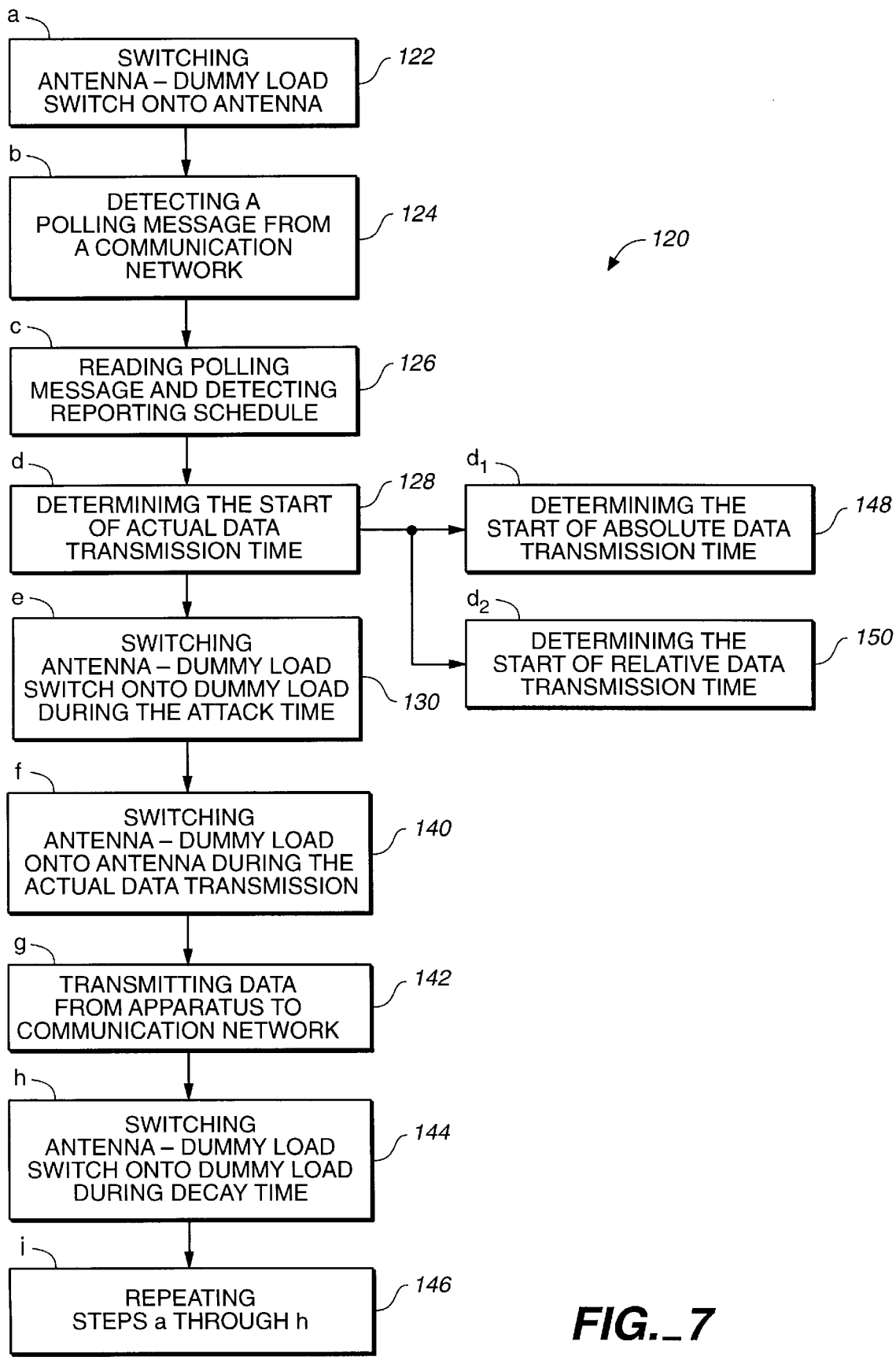
FIG._7

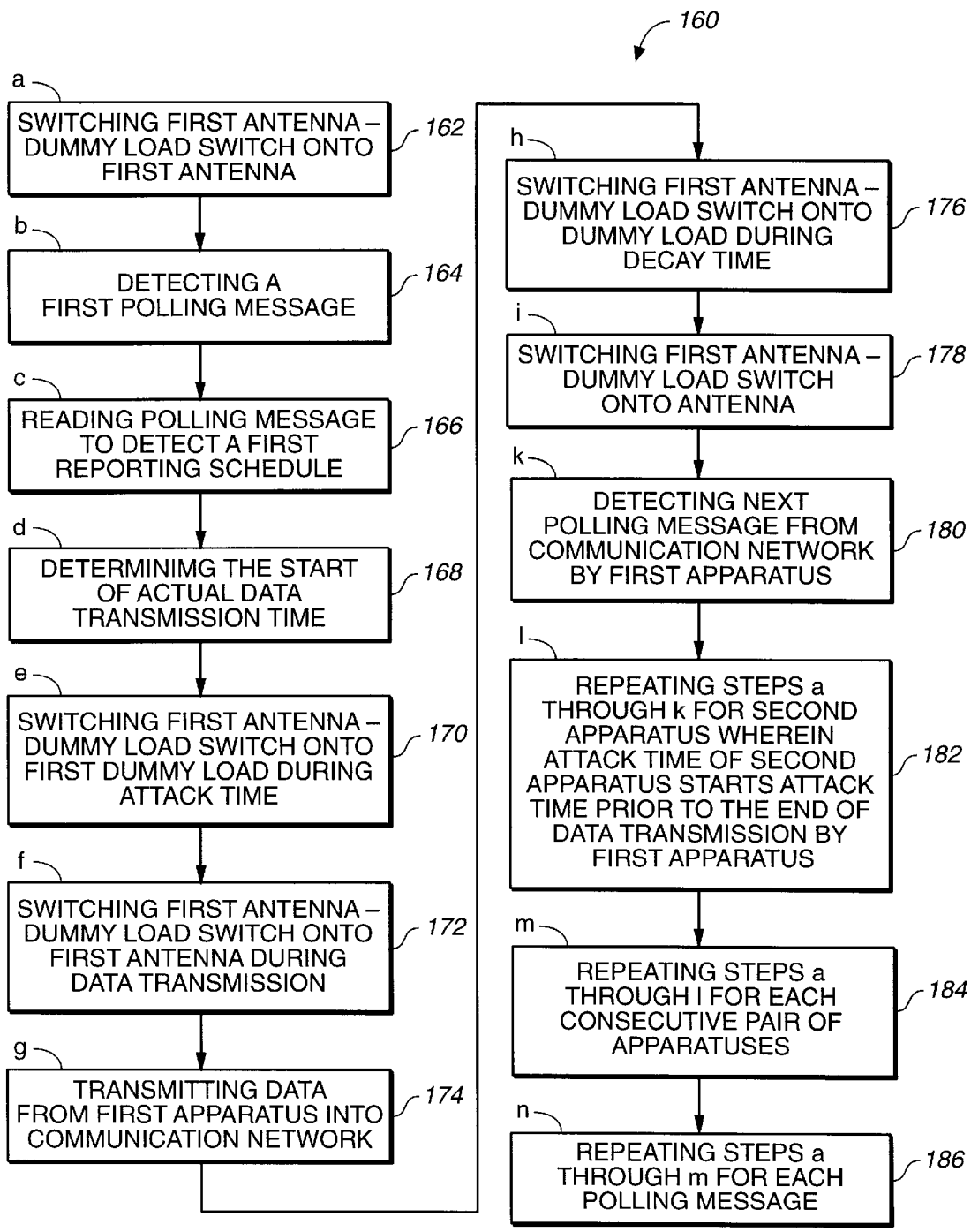
FIG._8 in the range of (10–100)
ANTENNA SWITCHING TECHNIQUE FOR IMPROVED DATA THROUGHPUT IN COMMUNICATION NETWORKS

BACKGROUND

A typical prior art single communication system generating radio frequency (r.f.) power that is used for communicating with a communication network comprises a radio transmitter, a radio receiver, a receiver-transmitter switch, a r.f. power generator, and an antenna. In a receiving mode, when the receiver-transmitter switch is connected to the radio receiver, the system is listening to the signals incoming from the communication network. No r.f. power is used during this mode of operation because no r.f. signal is transmitted by the system. In a transmitting mode, when the receiver-transmitter switch is connected to the radio transmitter, the system can perform the data transmission to the communication network. However, in order to perform the actual data transmission, the user has to key the radio, that is to turn the source of the r.f. power on and to establish the frequency channel with the communication network. The time between keying the radio and when the radio is at full r. f. power and on frequency is called the attack time. The typical attack times are in the range of (10–100) milliseconds (msec). After the radio is keyed, the system can perform the data transmission. The actual single system data transmission time can be significantly reduced by using the data compression protocols. Therefore, the single system data transmission time can be in the range of (10–20) msec. After the data transmission is over, the radio is unkeyed by turning the r.f. power off. The time associated with this operation is called the decay time. The typical decay times are in the range of (10–100) msec. Thus, in the worst case scenario, when the attack time is 100 msec, the decay time is 100 msec, and the data transmission time is 10 msec, the single system spends only 5% (10/210) of the time in the transmitting mode for the actual data transmission and 95% (200/210) for the key and unkey operations. Even in the best case scenario, the data transmission time constitutes only 50% (20/40) of the time in the transmitting mode, and the key and unkey operations take 50% of the single system time in the transmitting mode.

This problem is exacerbated when a set of N, N being an integer, r.f. communication systems interact with the same communication network on the same frequency. If this is a case, only one system can transmit data to the communication network without interference with the other N-1 systems. Therefore, the N-system transmitting mode time includes N attack times, N decay times, and N data transmission times, assuming that each system has the same attack time and decay time. Thus, the N-system can transmit data to the communication network only during the fraction of the total time spent in the transmitting mode, and the N-system transmitting mode time can be in the order of N attack times. For N=10, the typical transmitting mode times are in the range of (0.1–1) sec.

What is needed is a generating r.f. power communication system that interacts with the communication network in the transmitting mode without wasting time on the radio key and unkey operations. The actual data transmission time of such system would comprise the larger portion of the whole time in the transmitting mode than in the case of the conventional r. f. system. As a result, such system would have an improved and very short data throughput into the communication network.

SUMMARY

The present invention is unique because it discloses a single r.f. power generating communication system that interacts with a communication network in the transmitting mode with the effectively eliminated attack and decay phases. The present invention also discloses an N set of such r.f. power generating single communication systems interacting with the same communication network.

One aspect of the present invention is directed to an apparatus for improved data throughput in a communication network. The apparatus comprises: (a) an antenna; (b) a dummy load; (c) a radio frequency receiving-transmitting means; (d) a modem; (e) a computer; (f) a time-determination means; and (g) an antenna-dummy load switch; wherein the antenna-dummy load switch is operated by the computer. If the antenna-dummy load switch is connected to the dummy load the apparatus is disconnected from the communication network, and if the antenna-dummy load switch is connected to the antenna the apparatus is connected to the communication network.

In the preferred embodiment, the apparatus further includes a program means for operating the computer. The program means determines whether a polling message including a reporting schedule has been received by the apparatus from the communication network. If the reporting schedule has been received, the program directs the computer to operate the antenna-dummy load switch according to the reporting schedule. In one embodiment, the program means includes a computer software means.

In one preferred embodiment, the time-determination means is selected from a class of satellite-based time-location determination systems consisting of a Global Positioning System Receiver and a Global Orbiting Navigational Satellite System Receiver.

In another preferred embodiment, the time-determination means is selected from a class of ground-based time-location determination systems consisting of Loran, Tacan, Decca, Omega, JTIDS Relnav, PLRS, and VOR/DME Receiver.

The apparatus can include receiving-transmitting means that transmits and receives at the same frequency f. The apparatus can also include the receiving-transmitting means that transmits at a frequency f1 and receives at a different frequency f2.

Another aspect of the present invention is directed to a single frequency system comprising a plurality of apparatuses connected to a communication network for improved data throughput into the communication network. Each apparatus includes an antenna; a dummy load; a radio frequency receiving-transmitting means; a modem; a computer; a time-determination means; and a computer operated antenna-dummy load switch; wherein each apparatus interacts with the communication network on the same single radio frequency f0.

Yet, another aspect of the present invention is directed to a plurality of single frequency systems connected to a communication network for improved data throughput into the communication network. Each single frequency system includes a plurality of apparatuses. Each apparatus comprises: an antenna; a dummy load; a radio frequency receiving-transmitting means; a modem coupled to said receiving-transmitting means; a computer; a time-determination means; a computer operated antenna-dummy load switch; and a multi-frequency switch; wherein each single frequency system interacts with the communication network on its own and different frequency.

One more aspect of the present invention is directed to a method for improved data throughput in a communication network. The method employs an apparatus comprising: an antenna, a dummy load, a radio frequency receiving-transmitting means, a modem, a computer, a program means, a time-determination means, and a computer operated antenna-dummy load switch. The method comprises the steps of: (a) switching the antenna-dummy load switch onto the antenna using the computer; (b) operating the receiving-transmitting means in a receiving mode to detect a polling message from the communication network; (c) reading the polling message using the program means to detect a reporting schedule contained in the polling message; (d) determining the start of the actual data transmission time from the reporting schedule by the computer; (e) switching the antenna-dummy load switch onto the dummy load during the attack time of data transmission by the receiving-transmitting means using the computer; (f) switching the antenna-dummy load switch onto the antenna during the actual time of data transmission by the receiving-transmitting means using the computer; (g) operating the receiving-transmitting means in the transmitting mode to transmit data from the apparatus to the communication network; (h) switching the antenna-dummy load switch onto the dummy load during the decay time of data transmission by the receiving-transmitting means using the computer; and (i) repeating steps (a) through (h).

The step (d) of determining the start of the actual data transmission time from the reporting schedule by the computer can further include the step of determining the absolute data transmission time by the time-determining means according to the reporting schedule, wherein the absolute transmission time is referenced to the EPOCH time mark not related to the reporting schedule.

The step (d) of determining the start of the actual data transmission time from the reporting schedule by the computer can also include the step of determining the relative data transmission time by the time-determining means according to the reporting schedule, wherein the relative transmission time is referenced to the EPOCH time mark related to the reporting schedule.

Yet one additional aspect of the present invention is directed to a method for improved data throughput into a communication network. The method employs a single frequency system comprising a plurality of apparatuses connected to the communication network, wherein the plurality of apparatuses comprises a first apparatus, a second apparatus, and each consecutively numbered apparatus until the plurality of apparatuses is exhausted, the last apparatus is numbered as an N-apparatus, N is an integer. Each apparatus comprises an antenna, a dummy load, a radio frequency receiving-transmitting means, a modem, a computer, a time-determination means, a program means, and a computer operated antenna-dummy load switch. Each apparatus interacts with the communication network on the same single radio frequency f0. Each apparatus has the same attack time and the same decay time. The method comprises the steps of: (a) switching the first antenna-dummy load switch onto the antenna using the first computer of the first apparatus; (b) operating the first receiving-transmitting means of the apparatus in a receiving mode to detect a polling message from the communication network; (c) reading the polling message using the first program means of the first apparatus to detect a first reporting schedule for the first apparatus contained in the polling message; (d) determining the start of the actual data transmission time from the first reporting schedule by the first computer of the first apparatus; (e) switching the first antenna-dummy load switch onto the first dummy load during the attack time of data transmission by the first receiving-transmitting means using the first computer of the first apparatus; (f) switching the first antenna-dummy load switch onto the first antenna during the actual time of data transmission by the first receiving-transmitting means using the first computer of the first apparatus; (g) operating the first receiving-transmitting means in the transmitting mode to transmit data from the first apparatus into the communication network; (h) switching the first antenna-dummy load switch onto the first dummy load during the decay time of data transmission by the first receiving-transmitting means using the first computer of the first apparatus; (i) switching the first antenna-dummy load switch onto the antenna using the first computer of the first apparatus; (k) operating the first receiving-transmitting means of the apparatus in a receiving mode to detect a next polling message from the communication network; (l) repeating steps (a) through (k) for the second apparatus, wherein the attack time of the second apparatus data transmission starts at attack time prior to the end of the data transmission by the first apparatus, and wherein the second apparatus starts the data transmission at the same time mark when the first apparatus ends the data transmission; (m) repeating steps (a) through (l) for each consecutive pair of the t-apparatus and the (t-1) apparatus, t being an integer, wherein t is greater than 2 and less or equal to N; and (n) repeating steps (a) through (m) for each polling message.

BRIEF DESCRIPTION OF THE DRAWINGS.

FIG. 1 depicts a typical prior art single communication system generating radio frequency (r.f.) power that can be used for communicating with a communication network.

FIG. 2 illustrates the data transmission timing diagram including an attack time and a decay time associated with the data transmission by the prior art r.f. single communication system.

FIG. 3 is an illustration of the data transmission timing diagram of a pair of prior art r.f. single communication systems including an attack time phase and a decay time phase.

FIG. 4A depicts an r. f. power generating apparatus that employs an antenna-dummy load switch to improve the data throughput in a communication network.

FIG. 4B is an illustration of the timing characteristic of the r.f. power of the apparatus of FIG. 4A and the corresponding timing characteristic of the computer signal that operates the antenna-dummy load switch of the apparatus of FIG. 4A.

FIG. 4C illustrates a plurality of single frequency systems, wherein each system includes a plurality of apparatuses of FIG. 4A interacting with the communication network of FIG. 4A, and wherein each apparatus of FIG. 4A optionally includes a multifrequency switch.

FIG. 5 shows the data transmission timing diagram by a pair of the r. f. apparatuses with the improved data throughput.

FIG. 6 depicts the data transmission timing diagram by a plurality of the r. f. apparatuses with the improved data throughput.

FIG. 7 is a flow chart that illustrates the steps of the method employing a single apparatus for improved data throughput in a communication network.

FIG. 8 illustrates a flow chart that shows the steps of the method employing a plurality of single apparatuses for improved data throughput in a communication network.

FULL DESCRIPTION OF THE PREFERRED EMBODIMENT.

FIG. 1 illustrates a prior art embodiment of an r.f. generating system 10 capable of communicating with a communication network 22. The r. f generating system 10 can include a standard radio receiver-transmitter system, or a cellular radio transmitter-receiver system, or any other r.f. generating communication system. The system 10 includes a r.f. transmitter 14, a r.f. receiver 12, a receiver-transmitter switch 16, a r.f. power source 20, and an antenna 18. In a transmitting mode, when the receiver-transmitter switch is connected to the radio transmitter, the system can perform the data transmission to the communication network. As shown in FIG. 2, the attack time phase of communication (32) of an r. f. system with a communication network includes the time required to turn the r.f. power on and the time needed to establish the frequency channel with the communication network. The typical r. f. communication system attack times are in the range of (10–100) (msec). After the attack time phase, there is the data transmission phase (34) when the system can perform the data transmission. The typical single system data transmission times are in the range of (10–20) msec. After the data transmission is over, the r. f. transmitter is unkeyed by turning the r.f. power off. This is the decay phase (36). The typical r. f. communication system decay times are in the range of (10–100) msec.

FIG. 3 depicts the data transmission timing diagram 40 for a pair of prior art r.f. power generating communication systems 10 of FIG. 1, wherein the attack phase of the second system (46) coincides with the decay phase of the first system (46). However, even in this most data transmission time efficient prior art embodiment the time spent on the data transmission by the first system (44) and by the second system (48) is small in comparison with the overall time spent by the pair of the single systems 40 in the transmitting mode.

FIG. 4A depicts a r. f. power transmitting communication system 60 that is able to transmit data to a communication network 78 without wasting time on the attack and decay times. The apparatus 60 comprises the subject matter of the present invention. The apparatus 60 can be installed in any mobile vehicle like a personal automobile, a rental automobile, a truck, a delivery van, or a trailer. The apparatus 60 can be also installed on any immovable platform.

The apparatus 60 includes a clock means 62. In one embodiment, the clock means position can include a satellite positioning system (SATPS) receiver, such as a global positioning system (GPS) receiver, or a Global Orbiting Navigational Satellite System (GLONASS) Receiver. In another embodiment, the clock means can include a Loran, Tacan, Decca, Omega, JTIDS Relnav, PLRS, or VOR/DME Receiver. Yet, in one more embodiment the clock means can include a precise cesium or rubidium atomic clock. It is understood, that the clock means can include any clock which is fit for the purposes of the present invention.

In the preferred embodiment, the clock means includes a Global Positioning System (GPS) receiver with a GPS antenna. The GPS receiver can include a model 7400MSi™ L1/L2 Dual Frequency, manufactured by Trimble Navigation. The GPS antenna can include a magnetically mountable model 21423-00 commercially available from Trimble Navigation of Sunnyvale, California and placed with the direct view of the sky. In the preferred embodiment, the GPS antenna is able to receive the satellite signals from at least four satellite-vehicles that are part of the GPS.

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiplies $f1=1540$ $f0$ and $f2=1200$ $f0$ of a base frequency $f0=1.023$ MHz. The L1 signal from each satellite is binary phase shift key (BPSK) modulated by two pseudo-random noise (PRN) codes in phase quadrature, designated as the C/Acode and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\sim f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 $f0=10.23$ MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of $f0=1.023$ MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and the P(Y)-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemerides of the transmitting GPS satellite (which includes a complete information about the transmitting satellite within the next several hours of transmission) and an almanac for all GPS satellites (which includes less detailed information about all other satellites). The satellite information has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+ 9k/16) GHz and f2=(1.246+7k/16) GHz, where k (=0,1,2, . . . 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz). The L2 code is presently modeled only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta ti$), wherein ($\Delta ti$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

The SATPS receiver is capable of determining receiver absolute position in an Earth-centered, Earth-fixed coordinate reference system utilized by the SATPS by obtaining the navigational solution of the set of four simultaneous equations:

$$(x1-x0)^2+(y1-y0)^2+(z1-z0)^2=(r1-cb)^2 \qquad \text{(Eq. 1)}$$

$$(x2-x0)^2+(y2-y0)^2+(z2-z0)^2=(r2-cb)^2 \qquad \text{(Eq.2)}$$

$$(x3-x0)^2+(y3-y0)^2+(z3-z0)^2=(r3-cb)^2 \qquad \text{(Eq.3)}$$

$$(x4-x0)^2+(y4-y0)^2+(z4-z0)^2=(r4-cb)^2 \qquad \text{(Eq.4)}$$

wherein:

(ri) is a pseudorange between the i-th satellite and the SATPS receiver;

(xi, yi, zi) is a 3-dimension coordinate of the i-th SATPS satellite;

(x0, y0, z0) is a 3-dimension unknown coordinate of the SATPS receiver position;

(cb) is the SATPS receiver clock bias error.

After the SATPS receiver determines the coordinates of the i-th SATPS satellite by picking up transmitted ephemerides constants, the SATPS receiver can obtain the solution of the set of the four equations for its unknown coordinates (x0, y0, z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.)

Thus, the apparatus 60 is able to precisely determine the absolute or relative time (see discussion below) of its data transmission to the communication network 78 employing the clock 62. The availability of the precise timing information is important because it allows the apparatus 60 to use a computer 66 to operate an antenna-dummy load switch 72. The computer 66 can be implemented by using a personal computer IBM-386, or an IBM-486, or a Pentium-based computer, or the work-station, or Apple® computer, or any embedded microprocessor based computer. The operating system can include a Microsoft DOS, or a Microsoft Windows® 3.1, or a Microsoft Windows®–95, or an IBM OS/2, or any real-time operating systems such as VRTX.

The computer operated antenna-dummy load switch 72 that is connected to a dummy load 76 and to an antenna 74 represents the essence of the present invention. The antenna-dummy load switch (see discussion below) allows the elimination of the attack phase and the decay phase from the data transmitting mode of operation of the apparatus 60. The antenna-dummy load switch is also connected to an r.f. receiver-transmitter 70.

The r.f. receiver-transmitter means 70 can include a standard radio means, a cellular telephone communication means, a paging signal receiving means, a wireless messaging services, a wireless application services, a wireless WAN/LAN station, or an Earth-satellite-Earth communication module that uses at least one satellite to relay a radiowave signal. The cell phone may be implemented by using a GE-Ericsson 'Carfone V' AMPS cellular mobile radio, having no handset, and handling only data transmission. See the *Cellular Radio Systems,* by D. M. Balston, and R. C. V. Macario, Artech House, Inc., 1993.

In the preferred embodiment, the r.f. receiver-transmitting means 70 utilizes only one frequency f for receiving data from and for transmitting data to the communication network 78. In another embodiment (the duplex embodiment), the r.f. receiver-transmitter employs two radio channels, forward and reverse for transmitting and receiving the data.

The r.f. receiver-transmitter is connected to the computer 66 using a modem 68. The digital signal processor (DSP) (or modem) 68 includes an analog-to-digital converter and a digital-to-analog converter. The analog-to-digital converter converts external analog signals received by the r.f. receiver-transmitter 70 from the communication network 78. The digital-to-analog converter converts internal digital signals generated by the computer 66 into the external analog signals transmitted to the communication network by the r.f. receiver-transmitter 70. The protocol can be a conventional Hayes command set recognizable by the Hayes -AT compatible modem 68. The modem 68 can be implemented by utilizing a Dataport® modem produced by AT&T Paradyne, Largo, Fla.

In the preferred embodiment, the apparatus 60 includes a software means 64. The software means 64 can include a custom-made user interface and a custom-made communication controller connected to the Hayes-AT compatible modem 68.

The software means 64 has several main functions. At first, it should be able to detect the polling message from the communication network 78. Secondly, the software means 64 should be able to read the polling message in order to detect the reporting schedule for the apparatus 60. Lastly, the software means should have a capability to operate the antenna-dummy load switch via the computer 66. As explained below (see discussion of FIG. 5 and 6), this results in the elimination of the attack and decay phases from the data transmitting mode of operation of the apparatus 60 and in the improved data throughput from the apparatus 60 into the communication network 78.

FIG. 4B is an illustration of the timing characteristic (65) of the r.f. power of the apparatus of FIG. 4A and the corresponding timing characteristic (67) of the computer signal 61 that operates the antenna-dummy load switch 72 of the apparatus 60 of FIG. 4A.

FIG. 4C depicts another preferred embodiment of the present invention, wherein a plurality 77 of the single apparatuses 60 of FIG. 4A interacts with the same communication network 78 on the same frequency f. In another embodiment, FIG. 4C depicts a plurality of single frequency systems, wherein each system includes a plurality of apparatuses of FIG. 4A, and wherein each apparatus 60 optionally includes a multifrequency switch. All apparatuses #1 through #N, N being an integer, are presumed to have the same attack and decay times for each frequency.

FIG. 5 illustrates that the attack phase (84) of the data transmission phase (87) from the apparatus #2 (84) to the communication network 78 of FIG. 4A starts an attack time prior to the end of the data transmission phase of the apparatus #1 (85), wherein the decay phase (86) of the data transmission phase (85) from the apparatus #1 to the communication network starts a decay time prior to the start of the data transmission phase (87) of the apparatus #2. Therefore, the data transmission phase of the apparatus #2 immediately follows the data transmission phase of the apparatus #1 and the intermediate attack and decay phases are effectively eliminated. If the next polling message comes in not immediately after the end of the data transmission from the apparatus #2, only the initial attack phase (82) of the apparatus #1 and the final decay phase (88) of the apparatus #2 survive. However, if the next polling message comes in immediately after the end of the data transmission from the apparatus #2, no decay phase or attack phase will survive.

FIG. 6 is an illustration of the interaction of the plurality of the apparatuses of FIG. 4B with the communication network on the same frequency that results in the effective elimination of all intermediate attack and decay phases 104, 106, 108, and 110. Again, if the next polling message comes in not immediately after the end of the data transmission from the apparatus #N, only the initial attack phase (102) of the apparatus #1 and the final decay phase (112) of the apparatus #N survive. However, if the next polling message comes in immediately after the end of the data transmission from the apparatus #N, no decay phase or attack phase will survive.

FIG. 7 illustrates the flowchart 120 describing the steps of the method employing a single apparatus 60 of FIG. 4A for improved data throughput in a communication network. The step 122 corresponds to the initial step of switching the antenna-dummy load switch onto the antenna position. At this step the apparatus 60 is in receiving mode, that is the r.f. transmitting-receiving means are in the receiving position. The apparatus 60 is listening and waiting for the polling messages incoming from the communication network. When the first polling message comes in, it is detected (step 124) and read in order to detect the reporting schedule (step 126) by a computer 66 operated by a software means 64. The reporting schedule contains detailed instructions for the apparatus 60 that specify what data the apparatus should start transmitting to the communication network and at what precisely moment in time. The apparatus 60 employs the clock 62 to precisely determine the start of the data transmission. (Step 128). The apparatus 60 has its own attack time phase that precedes the data transmission phase. The attack phase is needed to turn the source of the r.f. power on and to establish the frequency channel for communication with the communication network. The apparatus 60 also has its own decay phase of operation subsequently to the data transmission phase at which the r.f. power is turned off. However, the antenna-dummy load switch eliminates the attack and decay phases from the data transmitting mode of operation of the apparatus 60. (See discussion below).

In one preferred embodiment, the step of determining the starting time for the data transmission using the clock means (step 128) includes the step of determining the start of the absolute time of the data transmission (step 148), wherein the absolute time of the data transmission can be defined in some time coordinate system. For instance, the absolute time for the beginning of the data transmission can be defined in terms of certain amount of seconds from the absolute time of 0000 hours on the Jan. 6, 1980 (the start of the GPS time); or in relation to any other ABSOLUTE EPOCH time mark.

In another preferred embodiment, the step of determining the starting time for the data transmission using the clock means (step 128) includes the step of determining the start of the relative time of the data transmission (step 150). The relative time of the data transmission is the time defined in relation to a RELATIVE EPOCH time mark. For instance, the reporting message itself can contain the RELATIVE EPOCH time mark.

After the precise time of the start of the data transmission is defined in relation to the ABSOLUTE EPOCH time mark, or in relation to the RELATIVE EPOCH time mark, the computer switches the antenna-dummy load onto the dummy during the attack time of the data transmission (step 130). During this step of operation the apparatus 60 turns the source of the r.f. power on. Therefore, if the communication network 78 (FIG. 4A) communicates with a plurality of apparatuses 60, the first apparatus 60 during its attack phase of operation does not generate any r. f. power. Hence, the first apparatus 60 does not interfere with any other r. f. power generating apparatus that can communicate with the same communication network 78 on the same frequency during the attack phase of the first apparatus. Effectively, this results in a r.f. power generating apparatus 60 that does not have an attack phase of the data transmission. Indeed, the disclosed apparatus 60 does not have the attack phase of the data transmission because the interference of this apparatus with any other r.f. power generating apparatus communicating with the same communication network on the same frequency is effectively eliminated during the attack phase of the data transmission.

The step 140 describes the step of switching by the computer the antenna-dummy load onto the antenna position in order to start the data transmission from the apparatus 60 into the communication network 78. After the data transmission is completed (step 142), the computer switches the antenna-dummy load switch onto the dummy load position during the decay phase of the data transmission (step 144) in order to eliminate the interference of the apparatus 60 with any other apparatus that may communicate with the same communication network on the same frequency at the same time. This effectively results in a r.f. power generating apparatus that does not have a decay phase of the data transmission.

The step 146 indicates that all steps 122 through 144 should be repeated in order for the apparatus 60 to react on the next polling message incoming from the communication network 78.

FIG. 8. illustrates a flow chart that shows the steps of the method for improved data throughput in a communication network, wherein the method employs a plurality of single apparatuses of FIG. 4B interacting with the same communication network on the same frequency. The steps 162 through 176 describing the interaction of the first apparatus from this plurality of apparatuses with the communication network are the same steps as the steps 122 through 144 of FIG. 7 describing the interaction of the single apparatus of FIG. 4A with the communication network. Steps 178 and 180 describe the return of the apparatus # 1 into the initial listening mode after the data transmission from this apparatus to the communication network is completed.

The same steps 162 through 180 are performed for the apparatus #2 (step 182), wherein the attack phase of the apparatus # 2 starts an attack time prior to the end of the data transmission phase of the apparatus # 1.

After the step 182 is performed, the step 184 is performed. The step 184 includes all steps 162 through 182 that are repeated for every pair of apparatuses of FIG. 4B, starting with the pair of apparatuses # 2 and # 3, and ending with the pair of apparatuses # (N−1) and # N.

The whole process is repeated (step 186) for each polling message incoming from the communication network.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for improved data throughput in a communication network; said apparatus comprising:

an antenna;

a dummy load;

a radio frequency receiving-transmitting circuit;

a modem coupled to said receiving-transmitting circuit;

a computer coupled to said modem;

a time-determination system coupled to said computer;

an antenna-dummy load switch operably coupled to said antenna, operably coupled to said receiving-transmitting system, and operably coupled to said dummy load; and a computer software means;

wherein said computer software means determines if a polling message including a reporting schedule has been received by said apparatus from said communication network; and wherein said software means directs said computer to operate said antenna-dummy load switch according to said reporting schedule at times determined by said time-determination system; and wherein when said antenna-dummy load switch is connected to said dummy load said apparatus is disconnected from said communication network, and when said antenna-dummy load switch is connected to said antenna said apparatus is connected to said communication network.

2. The apparatus of claim 1, wherein said time-determination system is selected from a class of satellite-based time-location determination systems consisting of a Global Positioning System Receiver and a Global Orbiting Navigational Satellite System Receiver.

3. The apparatus of claim 1, wherein said time-determination system is selected from a class of ground-based time-location determination systems consisting of Loran, Tacan, Decca, Omega, JTIDS Relnav, PLRS, and VOR/DME Receiver.

4. The apparatus of claim 1, wherein said receiving-transmitting circuit transmits at a frequency, f; and wherein said receiving-transmitting circuit receives at said frequency f.

5. The apparatus of claim 1, wherein said receiving-transmitting circuit transmits at a frequency f1; and wherein said receiving-transmitting circuit receives at a different frequency f2.

6. A single frequency system comprising a plurality of apparatuses connected to a communication network for improved data throughput into said communication network, each said apparatus comprising:

an antenna;

a dummy load;

a radio frequency receiving-transmitting circuit;

a modem coupled to said receiving-transmitting circuit;

a computer coupled to said modem;

a time-determination system coupled to said computer;

a computer operated antenna-dummy load switch operably coupled to said antenna, operably coupled to said receiving-transmitting circuit, and operably coupled to said dummy load; and a computer software means;

wherein said computer software means determines if a polling message including a reporting schedule has been received by said apparatus from said communication network; and wherein said software means directs said computer to operate said antenna-dummy load switch according to said reporting schedule at times determined by said time-determination system; and wherein each said apparatus interacts with said communication network on the same single radio frequency f0.

7. A plurality of single frequency systems connected to a communication network for improved data throughput in to said communication network, each said single frequency system comprising:

a plurality of apparatuses; each said apparatus comprising:
an antenna;
a dummy load;
a radio frequency receiving-transmitting circuit;
a modem coupled to said receiving-transmitting circuit;
a computer coupled to said modem;
a time-determination system coupled to said computer;
a computer operated antenna-dummy load switch operably coupled to said antenna, operably coupled to said receiving-transmitting circuit, and operably coupled to said dummy load;
a computer software means; and
a multi-frequency switch;
wherein said computer software means determines if a polling message including a reporting schedule has been received by said apparatus from said communication network; and
wherein said software means directs said computer to operate said antenna-dummy load switch according to said reporting schedule at times determined by said time-determination system; and
wherein each said single frequency system interacts with said communication network on a different frequency.

8. A method for improved data throughput in a communication network; said method employing an apparatus comprising: an antenna, a dummy load, a radio frequency receiving-transmitting circuit, a modem, a computer, a program means, a time-determination system, and a computer operated antenna-dummy load switch; said method comprising the steps of:

(a) switching said antenna-dummy load switch onto said antenna using said computer;

(b) operating said receiving-transmitting circuit in a receiving mode to detect a polling message from said communication network;

(c) reading said polling message using said program means to detect a reporting schedule contained in said polling message;

(d) determining the start of the actual data transmission time from said reporting schedule by said computer;

(e) switching said antenna-dummy load switch onto said dummy load during the attack time of data transmission by said receiving-transmitting circuit using said computer;

(f) switching said antenna-dummy load switch onto said antenna during the actual time of data transmission by said receiving-transmitting circuit using said computer;

(g) operating said receiving-transmitting circuit in the transmitting mode to transmit data from said apparatus to said communication network;

(h) switching said antenna-dummy load switch onto said dummy load during the decay time of data transmission by said receiving-transmitting circuit using said computer; and (i) repeating steps (a) through (h).

9. The method of claim 8, wherein said step (d) of determining the start of the actual data transmission time from said reporting schedule by said computer further includes the step of determining the absolute data transmission time by said time-determining system according to said reporting schedule, and wherein said absolute transmission time is referenced to the EPOCH time mark not related to said reporting schedule.

10. The method of claim 8, wherein said step (d) of determining the start of the actual data transmission time from said reporting schedule by said computer further includes the step of determining the relative data transmission time by said time-determining system according to said reporting schedule, and wherein said relative transmission time is referenced to the EPOCH time mark related to said reporting schedule.

11. A method for improved data throughput in to a communication network, said method employing a single frequency system comprising a plurality of apparatuses connected to said communication network; said plurality of apparatuses comprising a first apparatus, a second apparatus, and each consecutively numbered apparatus until said plurality of apparatuses is exhausted, the last said apparatus being numbered as an N-apparatus, N being an integer; each said apparatus comprising an antenna, a dummy load, a radio frequency receiving-transmitting circuit, a modem, a computer, a time-determination system, a program means, and a computer operated antenna-dummy load switch, each said apparatus interacting with said communication network on the same single radio frequency f0, each said apparatus having the same attack time and the same decay time; said method comprising the steps of:

(a) switching said first antenna-dummy load switch onto said antenna using said first computer of said first apparatus;

(b) operating said first receiving-transmitting circuit of said apparatus in a receiving mode to detect a polling message from said communication network;

(c) reading said polling message using said first program means of said first apparatus to detect a first reporting schedule for said first apparatus contained in said polling message;

(d) determining the start of the actual data transmission time from said first reporting schedule by said first computer of said first apparatus;

(e) switching said first antenna-dummy load switch onto said first dummy load during the attack time of data transmission by said first receiving-transmitting circuit using said first computer of said first apparatus;

(f) switching said first antenna-dummy load switch onto said first antenna during the actual time of data transmission by said first receiving-transmitting circuit using said first computer of said first apparatus;

(g) operating said first receiving-transmitting circuit in the transmitting mode to transmit data from said first apparatus into said communication network;

(h) switching said first antenna-dummy load switch onto said first dummy load during the decay time of data transmission by said first receiving-transmitting circuit using said first computer of said first apparatus;

(i) switching said first antenna-dummy load switch onto said antenna using said first computer of said first apparatus;

(k) operating said first receiving-transmitting circuit of said apparatus in a receiving mode to detect a next polling message from said communication network;

(l) repeating steps (a) through (k) for said second apparatus, wherein the attack time of said second apparatus data transmission starts at attack time prior to the end of the data transmission by said first apparatus, and wherein said second apparatus starts the data transmission at the same time mark when said first apparatus ends the data transmission;

(m) repeating steps (a) through (l) for each consecutive pair of said t-apparatus and said (t-1) apparatus, t being an integer, wherein t is greater than 2 and less or equal to N; and (n) repeating steps (a) through (m) for each said polling message.

12. The method of claim 11, wherein said step (d) determining the start of the actual data transmission time from said first reporting schedule by said first computer of said first apparatus further includes the step of determining the absolute data transmission time by said first time-determining system according to said first reporting schedule, and wherein said absolute transmission time is referenced to the EPOCH time mark not related to said first reporting schedule.

13. The method of claim 11, wherein said step (d) determining the start of the actual data transmission time from said first reporting schedule by said first computer of said first apparatus further includes the step of determining the relative data transmission time by said first time-determining system according to said first reporting schedule, and wherein said relative transmission time is referenced to the EPOCH time mark related to said first reporting schedule.

* * * * *